(12) United States Patent
Perkins et al.

(10) Patent No.: US 6,767,099 B2
(45) Date of Patent: Jul. 27, 2004

(54) SYSTEM AND METHOD FOR DISPLAYING PHYSICAL OBJECTS IN SPACE

(76) Inventors: Richard Perkins, 30 Sailview Ave., Rancho Palos Verdes, CA (US) 90275; Gary T. Yamron, 30 Sailview Ave., Rancho Palos Verdes, CA (US) 90275

(*) Notice: Subject to any disclaimer, the term of this patent is extended or adjusted under 35 U.S.C. 154(b) by 0 days.

(21) Appl. No.: 10/305,519

(22) Filed: Nov. 26, 2002

(65) Prior Publication Data

US 2003/0151726 A1 Aug. 14, 2003

Related U.S. Application Data

(60) Provisional application No. 60/333,916, filed on Nov. 26, 2001.

(51) Int. Cl.[7] .......................... G03B 21/00; G02B 27/22
(52) U.S. Cl. ........................................ 353/10; 359/479
(58) Field of Search .............................. 353/10, 28, 29, 353/37, 74, 75, 77, 78, 98, 99, 122, 7; 359/478, 479; 434/371, 402, 403, 428

(56) References Cited

U.S. PATENT DOCUMENTS

| | | | |
|---|---|---|---|
| 1,044,715 A | | 11/1912 | Wearn |
| 2,285,509 A | | 6/1942 | Goshaw |
| 2,576,147 A | * | 11/1951 | Sauvage ...................... 40/427 |
| 3,316,803 A | * | 5/1967 | Carpenter et al. ............ 348/44 |
| 3,647,284 A | * | 3/1972 | Elings et al. ............... 359/858 |
| 3,647,289 A | | 3/1972 | Weber |
| 4,261,657 A | * | 4/1981 | Reiback ....................... 353/10 |
| 4,322,743 A | | 3/1982 | Rickert |
| 4,443,058 A | | 4/1984 | Bosserman |
| 4,776,118 A | | 10/1988 | Mizuno |
| 4,962,420 A | * | 10/1990 | Judenich ..................... 348/744 |
| 5,311,357 A | * | 5/1994 | Summer et al. ............ 359/479 |
| 5,886,818 A | * | 3/1999 | Summer et al. ............ 359/478 |
| 6,497,484 B1 | * | 12/2002 | Hoerner et al. ............... 353/10 |
| 6,616,282 B2 | * | 9/2003 | Ozawa ........................ 353/33 |

OTHER PUBLICATIONS

PCT International Search Report.

* cited by examiner

Primary Examiner—Russell Adams
Assistant Examiner—Andrew Sever

(57) ABSTRACT

A real image projection system is provided including a projection system housing with an aperture. This device provides a real image projected into a viewable volume of space relative to the aperture. An optical assembly and an object positioning device adjacent to the optic assembly provide the real image. The object positioning device may position an object adjacent to the optic assembly in dynamic or static fashion. The optical assembly receives the light rays reflected from the object and projects a real image of the object into the viewable volume of space. The invention provides environmental visual cues to promote perception of a three-dimensional image. The invention further includes a secondary mirror for use in reducing or minimizing the overall size of the system housing.

16 Claims, 6 Drawing Sheets

SYSTEM AND METHOD FOR DISPLAYING PHYSICAL OBJECTS IN SPACE

RELATED APPLICATIONS

This application claims priority to U.S. Provisional Application No. 60/333,916 filed Nov. 26, 2001, incorporated herein by reference.

FIELD OF THE INVENTION

The present invention relates to a system and method for displaying an object in space, in particular, the invention relates to a projection system for simulating an object suspended in a viewable volume of space.

BACKGROUND OF THE INVENTION

There is an increasing demand for products which enhance the visual experience of the observer. One particular category of these products is appealing because of their ability to make an observer accept as true that which the observer intuitively knows is not possible. For example, in one instance, these products may be designed to simulate on object suspended in free-space. In fact, what the observer sees is a virtual image of the object.

U.S. Pat. No. 3,647,284 to Ellings et al., is an example of one such device found in the prior art which simulates a suspended object. The Ellings patent discloses using mirrors in its arrangement. In particular, Ellings discloses a pair of concave mirrors placed opposite one another. An object to be projected, such as a coin or piece of jewelry is placed on a concaved surface of one of the mirrors. A real image of the object is then projected through a small opening in the surface of the opposite mirror. In this way, the object is made to appear three-dimensional and suspended in free-space.

U.S. Pat. No. 4,776,118 to Mizuno is another prior art system utilizing a mirrored device to simulate an object suspended in free-space. The Mizuno arrangement uses a concave mirror positioned opposite a television monitor. The television monitor displays a two-dimensional flat image which is projected on a transparent surface above the Mizuno projection device.

The Ellings and Mizuno systems are typical of prior art projection devices which are used to project images in free space. However, these devices are relatively simplistic. In other variations, the prior art systems may be more complex. For example, some prior art projection systems may require lenses, prisms, projectors, additional mirrors or the like for image projection.

One such sophisticated prior art system is disclosed in U.S. Pat. No. 4,322,743 to Rickert. The Rickert system uses a projection optic to focus an image of an object on a special screen. In one embodiment, the screen is a concave screen such as on a projection T.V. The screen concentrates the light forming the image. The image is focused on the surface of the screen and is brightest at the radius of the screen at the angle of projection.

Thus, as can be seen the prior art provides numerous devices for projecting images simulating objects suspended in free space. However, the images produced by the prior art systems are typically not the most effective simulation of the object. One reason is that, in general, the prior art systems do not take into consideration the means by which the viewers eye/brain system processes visual images. A more effective image projection system should make use of the manner in which the eye/brain system processes three-dimensional objects. These processes or perceptual cues impress upon the observer that the image he sees is actually located where it appears to be.

One method for using visual or perceptual cues to enhance a viewers experience is disclosed in U.S. Pat. No. 5,886,818 to Summer et al., which proposes using perceptual cues embedded within a video data stream. The Summer invention is limited, however, in that it uses flat, two-dimensional perceptual cues, which are not a true representation of actual three-dimensional perceptual cues to which the eye/brain system responds. The two-dimensional cues described in Summer are inherently limited in their effectiveness.

Simulation of an object suspended in space is most effective where the viewer is made to think that the image he sees is cast in three-dimensions and at a specific location in space. Three-dimensional images are those that give the perception that a solid form exists where one does not. Effectively, the eye/brain system uses its experience with perceptual cues to correlate certain visual and environmental references to corroborate the existence of a three-dimensional object. To understand how the brain perceives three-dimensional objects and their physical locations, it must first be understood how perceptual cues work to create a credible visual image.

In brief, the human brain determines whether the image is real by relating the images to the actual environment. That is, the brain makes use of environmental references to perceive an object in three-dimensions. Perceptual cues are patterns, physical objects, and experiential data that the eye/brain recognizes which aid the eye in determining particular characteristics about the image being processed. They may include perceptions about the object's size, position, and/or color relative to the environment in which the object is viewed.

Initially, an observer's eyes settle on a fixation point representing the distance at which corresponding retinal points within the eye are stimulated. A horopter is an imaginary plane in space drawn through that fixation point. Images in an observer's right and left eye received from objects near the horopter are fixed by the eye/brain system into single objects at the same depth plane. It is through the various properties of visual perception that environmental references relative to the horpoter, encourage a credible 3 dimensional impression in the mind.

For example, the property of visual perception known as optical occlusion focuses on the generally opaque nature of matter. In particular, through experience the human eye/brain system expects that where objects are in the same line of sight, objects nearer the observer will hide objects more distant from the observer. The eye/brain system will receive environmental visual cues such as which object is occluded relative to the other. The eye/brain system then determines that the occluded object is farther in distance from the observer than an object which in not occluded.

Another property of visual perception, which encourages three-dimensional impression on the eye/brain system, is stereopsis. Stereopsis makes use of the observer's biocular vision. In real life, each eye gets a slightly different view of the world when pointed at the same object. This is called stereoptic viewing. Through stereoptic viewing the eye/brain system perceives objects from two different vantage points. The brain, therefore, receives information about the viewing depth of the object from the distinct vantage points by triangulating the depth information to calculate a measurable distance of the object from the observer. More particularly, when the brain tells both eyes to focus on object, if the object is, for example, within approximately 10 feet, the eyes triangulate on the objects position and converge on the object at the point of triangulation. The closer the object, the greater the angle of convergence.

In yet another property of visual perception by which environmental cues promote three-dimensional impression, the eye/brain system makes use of its visual, historical, experience to interpret object. In general, a typical observer develops certain conceptions of object size relative to the environment in which it is viewed. The eye/brain system compares objects of known size in order to estimate their relative locations. The brain, based on previous experience, compares the observed object to the known size of that object and/or objects in the surrounding environment. Aware of the differences between the known size and the observed size, the brain then calculates a viewing distance that corresponds to the differences in object size.

In still another property of visual perception promoting three-dimensional impression on the eye/brain system, an object in motion at different distances from an observer appears to move at different speeds. Thus, as an object in motion moves toward an observer, the object appears to be picking up speed although the object's speed is constant. This motion parallax exists because the images of the approaching object moves at a greater distance on the retina in the same time than the images of the objects that are farther away.

Still another visual property promoting three-dimensional perception involves shadowing and lighting. For example, the eye/brain system is conditioned to recognize that light striking a three-dimensional surface produces shadows and highlights either on the surface itself or and/or adjacent surfaces upon which shadows are cast. The eye/brain system recognizes that two dimensional surfaces do not produce shadows as produced by a three-dimensional image. Consequently, where an image appears to include or cast shadows, the eye/brain system interprets that image as three-dimensional.

As noted, the visual perception properties are those by which three-dimensional imagery is promoted to the observer. Thus, to give a true image of an object, a device which purpose is to provide an observable three-dimensional image of an object must by its construction and operation take into consideration the visual perception properties discussed herein. The greater the number of visual perception properties taken into consideration, the more favorable and credible an observer's viewing experience.

The effect of the above visual perception properties on the eye/brain system is significantly enhanced by focal accommodation. Focal accommodation is the property of the eye/brain system which forces the eyes to focus on objects within about 10 feet from the observer as a beginning reference point. That is, within about 10 feet, the eyes will instinctively look for environmental cues which corroborate what the brain perceives. Contrarily, where the object is at a greater distance from the observer, the eyes will focus on optical infinity, with no particular focal point upon which to cue.

Presently, no known projection device is designed to focus an observer's eye/brain system by incorporating a plurality of visual perception cues. Therefore, a need exists for a real image projection system that makes use of the manner in which eye/brain system processes images to enhance the quality of the image. Such a system is highly desirable in that the observer will more readily believe the existence of the floating object and thus have a more credible viewing experience.

SUMMARY OF THE INVENTION

The above limitations and other problems of the prior art are overcome in accordance with the present invention. The present invention creates real images in such a manner as to create convergence of the eyes by using the natural operation of the eye/brain system. The invention makes use of environmental perceptual cues to encourage the brain to perceive an image in 3 dimensions (three-dimensional) and at a specific location in space. The environmental cues employed by the present invention promote a three-dimensional image on an observer's eye/brain system through the visual perception properties.

In accordance with one embodiment of the invention, a real image projection system is provided in which an object is presented to the reflective surface of an optical assembly. The optical assembly may then project a real image of the object between the observer and the optical assembly reflective surface. The real image system may additionally employ one or more concave or flat mirrors for image projection. Further, the optical assembly may be contained within a housing including an aperture. The housing may be thematic, personalized or generic. The aperture which defines a viewable volume of space into which the real image is projected may be such that it promotes three-dimensional impression upon the observer. The optical assembly and/or housing may be provided a device positioning apparatus for orienting the housing or assembly to position the image for the observer.

In accordance with exemplary embodiments of the invention, the object for projection may be static or dynamic. Where the object is dynamic, the object may be presented using any apparatus for moving or animating the object. In one exemplary embodiment the apparatus may alter the position of the object relative to the reflective surface. The apparatus may move the object from a distance remote from the optical assembly to near the optical assembly focal point. In this way, the image of the object may be made to appear to move toward the observer. In another embodiment, the apparatus may move only a portion or sub-portion of the object. So, for example, where the object resembles a human form, the apparatus may animate one or more of the objects limbs, sub-parts (mouth, nose, eyes, etc.) or the like. Further, the optical assembly and/or housing may include a device or apparatus for positioning the assembly or housing. Such apparatus may move the assembly or housing horizontally, vertically, spatially, or the like.

In yet another embodiment of the invention, the real image projection system may include environmental cues designed to focus the observers eye/brain system. The visual cues may be static or dynamic, and may include physical objects, lights or shadows. The visual cues may be included on the projection system housing for encouraging the observer's eye/brain system to focus in on the aspects of the image to effectively promote three-dimensional perception. In one embodiment, the various cues may be part of the housing, remote from the housing, or the housing itself.

In still another embodiment of the invention, the real image projection system may employ sound generating devices for further encouraging three-dimensional perception. The sound generating devices may present audible noises, music, or the like which may be designed to match the overall theme of the projection system.

BRIEF DESCRIPTION OF THE DRAWINGS

A more complete understanding of the present description may be derived by referring to the various exemplary embodiments which are described in conjunction with the appended drawing figures in which like numerals denote like elements, and in which.

DETAILED DESCRIPTION

The present description may be described herein in terms of functional block components and various processing steps. It should be appreciated that such functional blocks may be realized by any number of hardware components configured to perform the specified functions. The present invention may employ various integrated circuit components, e.g., memory elements, digital signal processing elements, logic elements, look-up tables, and the like, which may carry out a variety of functions described herein under the control of one or more microprocessors or other control devices. For example, the motors for automation may include any device or system for repositioning or animation of an object and may include any number of drive shaft or gearing arrangements or other motion transferring devices. In that regard, the object for use in projecting an image may be static or dynamic. The object may be anthropomorphic. The object may include one or more moving parts, which may be moved individually or collectively.

The present invention may employ various configurations of concaved mirrored surfaces configured to cast a real image above or below the surface principal axis. The mirrored surfaces may be a single uniform or irregular mirrored surface or a surface comprising integrated mirrored pieces. In addition, those skilled in the art will appreciate that the present invention may be practiced in any number of housing arrangements. Typical housing arrangements may be geared toward any holiday or special celebration as desired by the user or simply a generic enclosure utilizing the physical characteristics described herein.

It should be appreciated that the particular embodiments shown and described herein are merely exemplary and are not otherwise intended to limit the scope of the present invention. Indeed, for the sake of brevity, conventional rules involving real image projection using reflective surfaces, concaved or otherwise, may not be described in detail herein. In addition, although not specifically described in detail, conventional techniques for minimizing real image distortion and illumination of objects for image projection are considered to be within the scope of the invention.

Figure 1:
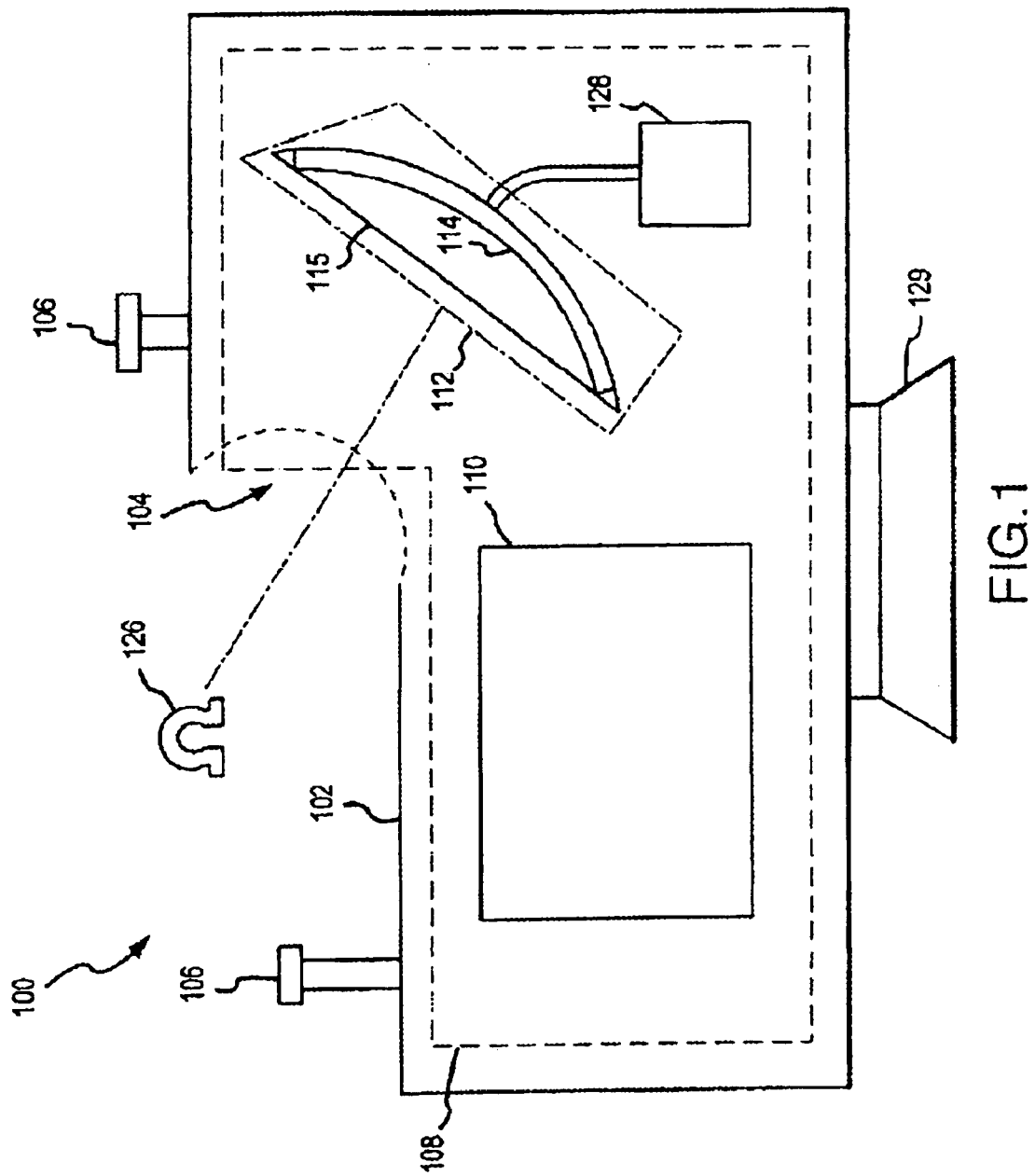
FIG. 1 illustrates a block diagram of an exemplary real image projection system in accordance with the present invention.

FIG. 1 depicts an exemplary real image projection system 100 in accordance with the present invention. The real image projection system 100 comprises a housing 102 including an aperture 104 defining a viewable volume of space. The housing 102 exterior may be thematic, personalized or generic, and may use the physical characteristics described herein. For example, the exterior may be made to resemble a home or office facet, mountain profile, city skyline or the like. Thus, it should be understood that the housing 102 exterior may be any structure as desired, which incorporates the features of the invention described below.

As noted, the housing aperture 104 defines a viewable volume of space. In this context, a "viewable volume of space" may mean that the aperture 104 provides an open space in the housing 102 through which an observer may view an image 126 positioned adjacent to the aperture 104. The aperture 104 provides a throughway from the space exterior to the housing 102 to the housing's interior. The aperture 104 may be any suitable shape for permitting an image to be projected there through. In one exemplary embodiment, the aperture may be curved such that the aperture 104 draws a concave arc with its center positioned toward the interior of the housing 102. The concaved configuration of the aperture 104 may aid in the perception that the image 126 is father removed from the housing 102. In addition, the ambient light falling on the concaved aperture 104 promotes greater shadow detail which further provides multiple planes of focus for increased depth perception by the eye/brain system. In another exemplary embodiment, the aperture 104 may include doors 107 (shown in FIG. 3) which may be automated. Doors 107 may include, for example, one or more doors, iris, shutter, curtain or the like restricting the passageway into the inner housing 102. Automation of the aperture doors may include any motor, pulleys, drives, shafts, microprocessor, or any such device (not shown) which may be configure to open or close the doors as desired. That is, the aperture doors 107 may be configured to open and close revealing and concealing the viewable volume of space. In this way, the aperture doors 107 may be used for providing a more interactive viewing experience as well as for protecting the housing 102 optical apparatus 102 from interference by foreign particles.

Various environmental cues 106 may be positioned on the housing 102 exterior to provide reference points which an observer's eye/brain system may use to determine a projected image's characteristics. The reference points 106 may be environmental cues for use by the observer to perceive an image's depth, contours, motion or the like. For example, the reference points 106 may be positioned such that the observer may perceive the image as being a certain distance from the observer relative to the reference points. Further, as noted, the housing 102 may provide sufficient reference points to promote credible three-dimensional perception. Further still, the aperture 104 may by its construction provide reference points for use by the observer to support three-dimensional image visualization.

In one exemplary embodiment of the invention, the reference points 106 may be fixed. Thus, when viewed relative to the image, any variation in the image size, shape, color or the like may be perceived as image motion relative to the fixed reference points 106. The reference points 106 may be positioned in the foreground, background or adjacent to the image produced. In another exemplary embodiment of the invention, the reference points 106 may be dynamic. In this instance, the reference points 106 may move and may work in concert with the image characteristics to further promote three-dimensional image perception. For example, the reference points 106 may move away from an observer while maintaining their distances respectively, at the same time the image size is increased to indicate that an image is rapidly moving toward the observer.

As should be understood, the reference points are effective since they force the eye/brain system of the observer to perceive the image in reference to the environment in which it is projected. Thus, the eye/brain system is able to perceive the image as containing depth, size, form, etc. in relation to the reference points 106. Consequently, where the projection system 100 is operated in ambient light, the ambient light may enhance the ability of the eye/brain system to relate the image to the reference points 106. That is, since the ambient light may highlight the positioning of the image.

Positioned inside the housing 102 may be an image projection system 108 for projecting an image 126 adjacent to the viewable volume of space defined by the housing aperture 104. The projection system 108 may include an object presentation apparatus 110 positioned adjacent to an optical assembly 112. Optical assembly 112 may include one or more mirrored surfaces. In one embodiment, optical assembly 112 may include a concaved mirror surface 115 including a concave mirrored reflective inner surface 114 formed as a surface revolution about a principal axis. The object presentation apparatus 110 may include any suitable apparatus for presenting an object to the reflective surface 114 (shown in FIG. 2), the reflective surface 114 thereafter casting an image 126 adjacent to the housing aperture 104.

The optical assembly 112 may be of any suitable configuration for projecting a real image of an object. In that sense, optical assembly 112 may include a reflective surface 114 of any suitable configuration for projecting an image 126 adjacent to aperture 104. In the exemplary embodiment illustrated, the reflective surface 114 is illustrated as concave for illustrative purposes only. Thus, concaved mirrored reflective inner surface 114 of the optical assembly 112 may be understood with respect to a conventional concave mirror although any curved reflective surface exhibiting the characteristics of a conventional concave mirror may be used herein.

Figure 2:
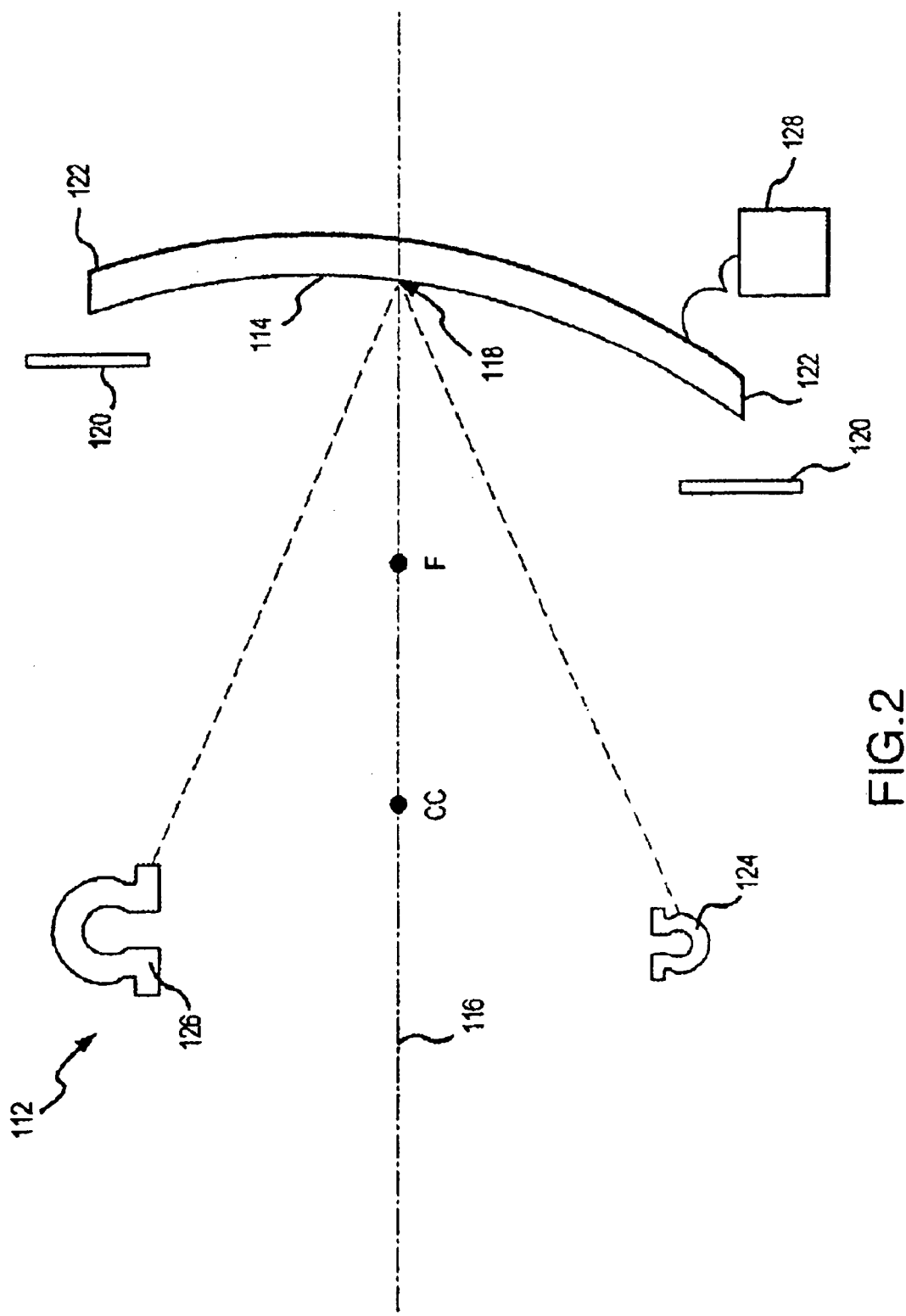
FIG. 2 illustrates an exemplary optical assembly in accordance with the present invention.

FIG. 2 is a depiction of an exemplary optical assembly 112 which may be used in accordance with the present invention. As shown, the optical assembly 112 includes a reflective inner surface 114 for receiving light reflected from an object 124 and casting an image 126 of the object 124. The reflective surface 114 may include a center 118 through which a principal axis 116 may be drawn where the principal axis may be drawn through the reflective surface center of curvature, cc, and focal point, F.

The reflective inner surface 114 may have similar operation, and the terms principal axis, center of curvature and focal point may have similar definition as commonly understood with respect to conventional concave mirrors. That is, light rays originating from an object may converge at a location between the optical assembly 112 and the observer to form a real image 126. Further, it is to be appreciated that for real image 126 to be an upright real image reflection of an object 124, the object 124 must be presented to the reflective surface 114 invertedly from at least a distance greater than or equal to the focal point F. These and other aspects of concave reflective surfaces are well known. As such, the aspects will not be repeated herein for brevity.

In some instances, the image 126 may be polluted due to spherical aberration. Spherical aberration in optical assemblies is a well-known phenomenon. Briefly stated, spherical aberration results when rays of light strike the reflective surface 114 and reflect in a manner such that the resulting image may be corrupted. The corrupted reflection may be due to imperfections on the reflective surface, or do to the light striking at the optical assembly edge 122 and reflect substantially perpendicular to the principal axis 116. These rays of light interfere with the rays of light converging to forming the reflected image, thereby affecting the clarity of the projected image.

To eliminate the affect of spherical aberration, baffles 120 may be used to prohibit lights rays from striking imperfections in the reflective surface 114 or to prevent the light from striking the optical assembly edge 122. In this case, the baffles 120 may be positioned at the optical assembly edge 122, for example, to prevent interfering rays of light from striking the surface 114. Alternatively, the baffles 120 may be placed over the surface 114 imperfections. In this context the baffles may be any suitable configuration for preventing the transmission of interfering light. Thus, in one exemplary embodiment baffles 120 are preferably opaque. In this way, baffles 120 may be used to prevent any article from casting an image on the reflective surface 114, where desired. Alternatively, baffles 120 may be such that it may be placed over aperture 104, for prohibiting glare promoting light rays. In this instance, anti-glare panel 120 may, for example, include a suitable polarized transparency for transmitting the desired light rays and prohibiting transmission of interfering ones.

With reference to FIG. 1, Optical assembly 112 may further include a positioning apparatus 128 for adjusting the orientation of reflective surface 114. The positioning apparatus 128 may be any suitable configuration for tilting the reflective surface 114 horizontally, vertically or both. The positioning apparatus 128 may be such that the optical assembly 112 may be made to rotate about its principal axis 116. By altering the orientation of the reflective surface 114, the appearance of image 126 may be adjusted as desired. In that regard, the positioning apparatus 128 may be any combination of motors, fasteners, drives, drive shafts that may be both electrical and mechanical. Positioning apparatus 128 may include any combination of microcontroller, microchips, system, controllers or the like capable of being manipulated as desired by the observer.

System 100 may include a positioning base 129 for adjusting the orientation of the housing 102 relative to the observer. Positioning base 129 may permit the housing 102 to be tilted in any direction. In addition, the base 129 may be capable of rotating 360 degrees. Thus, the base 129 may be a swivel base or the like.

Object presentation apparatus 110 may be any configuration suitable for presenting or displaying an object 124 adjacent to the reflective surface 114. The object presentation apparatus 110 may be static or dynamic. For example, in typical static arrangement, object presentation apparatus 110 may be a stationary stand upon which an object 124 may be fixed. Alternatively, object presentation apparatus 110 may include device for mobilizing or simulating movement of object 124. In one example, object presentation apparatus 110 may be any suitable arrangement for adjusting the orientation of object 124, delivering the object 124 adjacent to and/or removing the object 124 from adjacent to reflective surface 114. Some exemplary embodiments of object presentation apparatus 110 may include, for example, a conveyor system, projection system (e.g., film and shutter), a carousel system or the like. As previously noted, object presentation apparatus 110, may be such that it includes motors, drive shafts, or other motion promoting apparatus for animating an anthropomorphic object. The apparatus may include any suitable device for moving all or part of an object as desired.

As described more fully below, object presentation apparatus 110 may include optional additional mirrors for folding (and unfolding) an object image prior to providing the image to optional assembly 112. The presentation apparatus 110 may further include various motors, drives, drive shafts, microcontrollers, and the like for providing motion to the object 124. In addition, object presentation apparatus may include any additional illumination or mirror structures as required by a particular housing 102 arrangements. In addition, presentation apparatus 110 may include speakers for delivering experience enhancing sound during presentation of the image 126. It should be understood, that the optional illumination, mirrors, motors and speakers, may be included in the presentation apparatus 110, or a part from it, so long as the functionality of those optional elements is generally maintained. Further, the speakers, illumination device and the like may be coordinated with the theme of the real image projection system described herein, such that the lighting or speaker sound may correspond to a particular housing 102 or image 126 theme.

Figure 3:
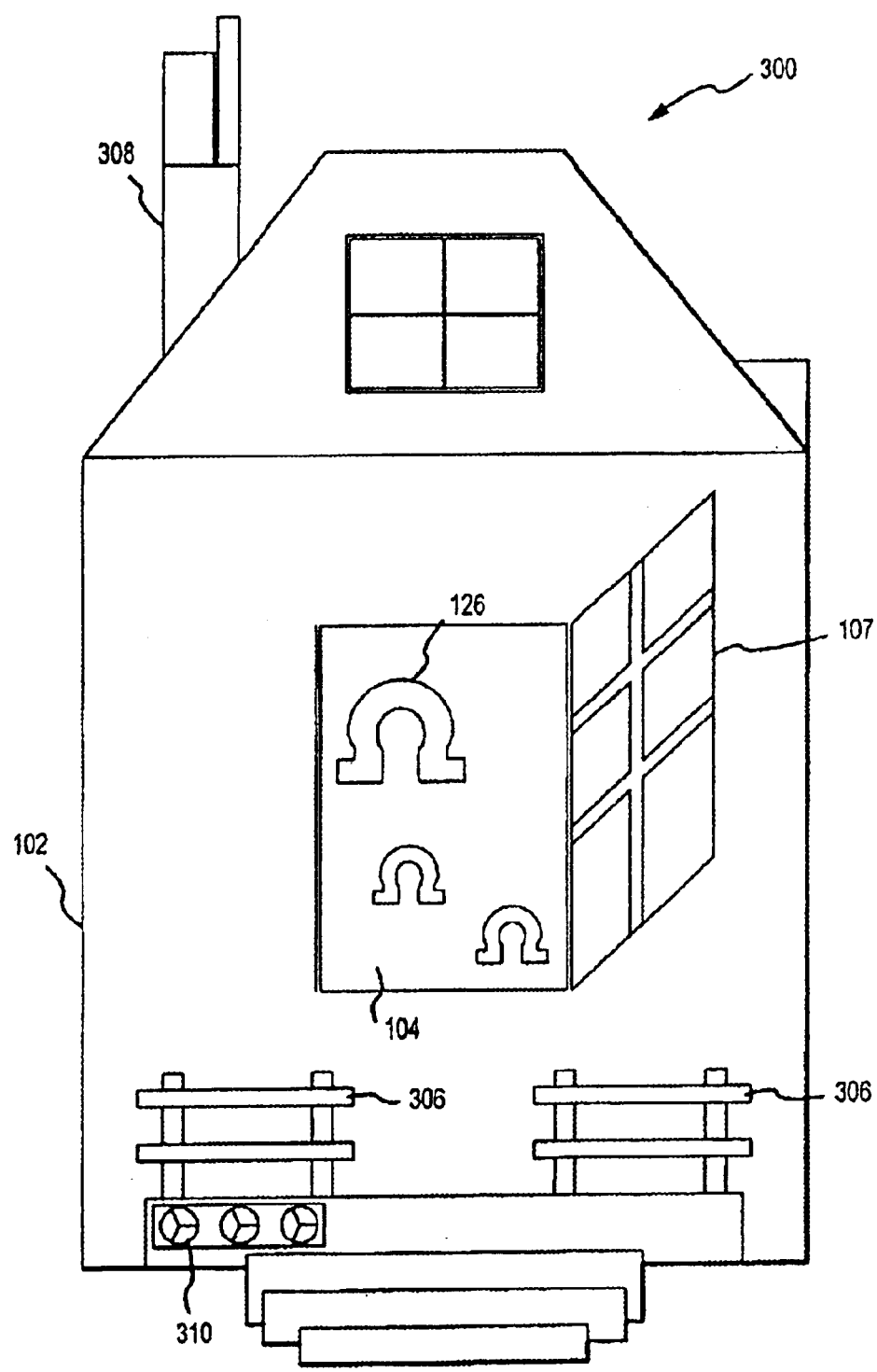
FIG. 3 illustrates an exemplary housing facet in accordance with the present invention.

The operation of a real image projection system 300 according to the present invention may be understood with reference to FIGS. 3–6 described below. FIG. 3 is a depiction of a front view of the exterior of a real image projection system 300 in accordance with the preset invention wherein like elements of FIG. 1 have like description. Projection system housing 102 is thematic, and is formed with an aperture 104 defining a viewable volume of space. In this instance the theme is a house, and the real images 126 which are project adjacent to the aperture 104 are images of its "inhabitants" (e.g., people), which appear to the user to be exiting the aperture 104.

The housing 102 also includes reference points 306, 308 for directing and focusing an observer's viewpoint. As shown, housing 102 may include a foreground reference element 306 and a background reference element 308. In this exemplary embodiment, the reference elements are made to appear as part of the house theme, with the background elements 308 appearing as a chimney and foreground element 306 appearing as front porch platform and/or a fence.

The housing 102 may additionally include controller 310 for controlling the operation of the projection system 300. Controller 310 may be any suitable switch, button, touch sensitive button, voice or motion activation controller or other controller configuration for operating, for example, an object presentation apparatus, a concave mirrored apparatus, a speaker, an illumination apparatus, and/or movement of reference point 306, 308 and the like, as described more fully below. The controller 310 may be coupled connected to any one of the aforementioned systems for use in controlling the sound emitted by the speakers, the orientation of the optical assembly or housing, the focusing of the real image 126, or any similar such controlling operation. The controller 310 may be configured to order the presentation of the images through the aperture 104.

Figure 4:
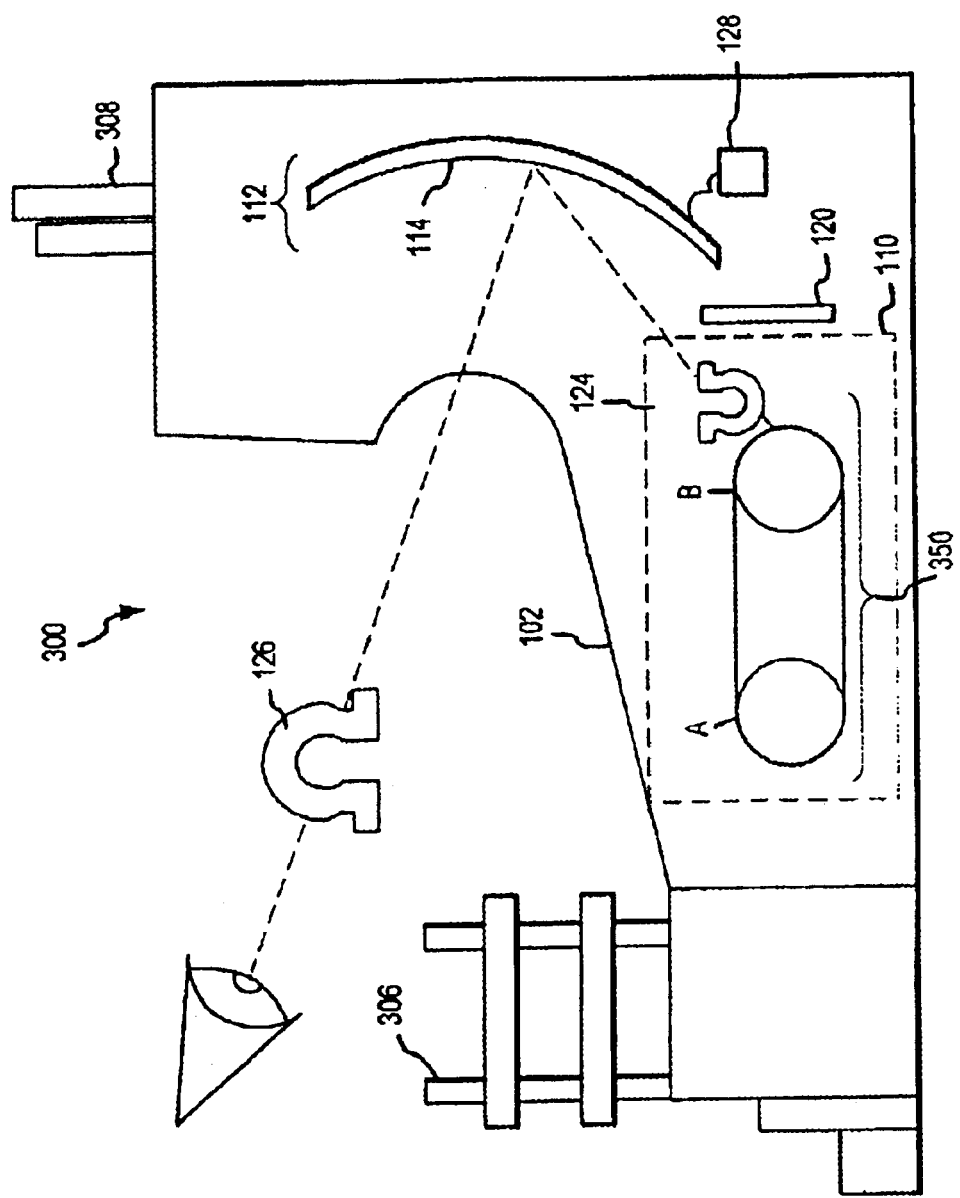
FIG. 4 illustrates a cross section of an exemplary real image projection system in accordance with the present invention.

FIG. 4 shows a cross-section view of an exemplary real image projection system 300 showing some exemplary internal components of similar description as similar elements described above. Exemplary image projection system 300 may include an object presentation apparatus 110, and an optical assembly 112 including a reflective surface 114. As shown, object presentation apparatus 110 may include a conveyor system 350 configured to position multiple objects 124 adjacent to reflective surface 114 of optical assembly 112.

As noted, optical assembly 112 may function in similar manner as conventional concave mirrored structures. That is, optical assembly 112 may present a real image 126 of object 124, in a viewable volume of space adjacent to the aperture 104, where the object 124 is positioned at a distance greater than or equal to the distance between the reflective surface 114 and the optical assembly 112 focal point shown in FIG. 2.

As can be seen, the conveyor system 350 is configured such that objects 124 may move from a position A to a position B, where the position A is more remote from the reflective surface 114 than is position B. As is well understood, at each distinct object 124 position, real image 126 will have a size dictated by the reflective characteristics of the reflective surface 114 and the distance of the object therefrom. For example, where the object 124 is positioned at position A, the resulting real image 126 is smaller in size than the corresponding real image for object 124 positioned at position B. Thus, as presentation apparatus 110 moves object 124 from position A to position B, the size of the real image 126 will increase. In this way, due to motion parallax, the real image 126 appears to move toward the observer.

Optical assembly 112 may include a positioning apparatus 128 for adjusting the optical assembly 112 orientation. Positioning apparatus 128 may be of any construction suitable for moving the optical assembly 112 horizontally, vertically, backward, forward or in any tilted position. Thus, positioning apparatus 128 may be suitable for permitting a user to bring the image 126 into the proper orientation for focusing.

Figure 5:
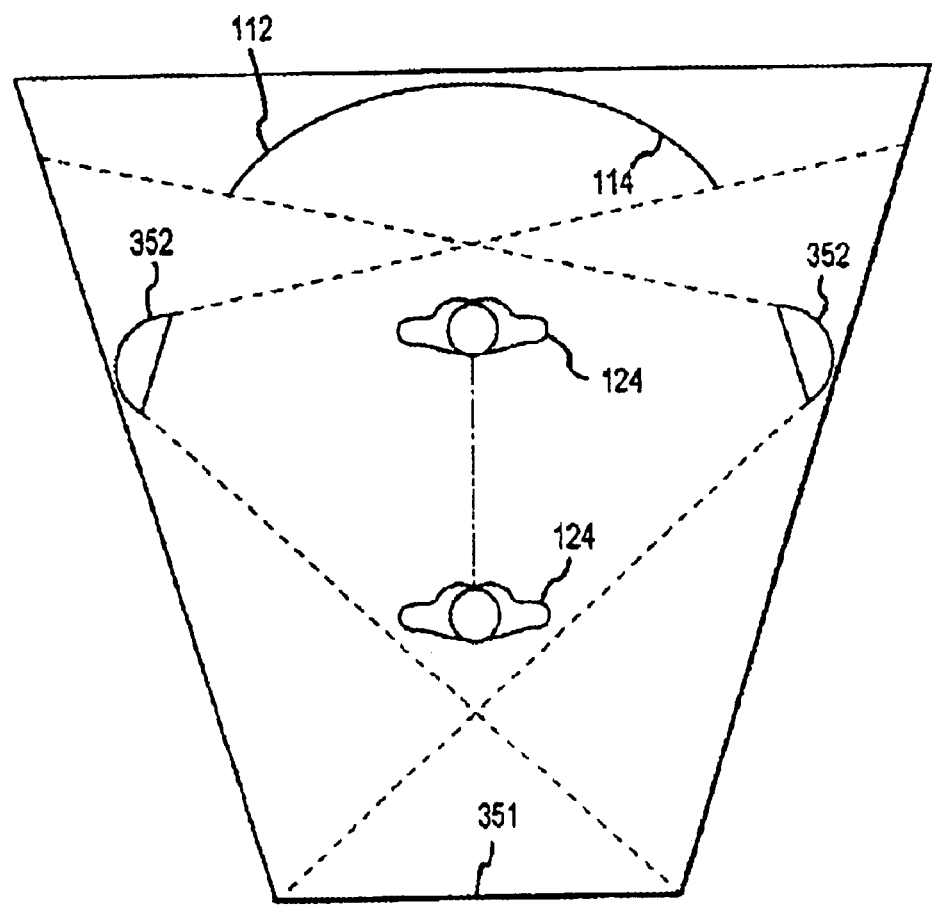
FIG. 5 illustrates an exemplary illumination device arrangement in accordance with the present invention.

As shown in FIG. 5, one or more illumination devices 352 may be used to illuminate an object 124 for enhancing shadows and depth perception. Illumination devices 352 may be used to illuminate object 124, for example, as the object progresses from position A to position B or, in such case where the object is static or anthropomorphic. Since object 124 may typically be a three-dimensional object, object 124 will cast shadows either on the surface of the object 124, or to the side or rear of object 124 as a result of the interaction of the object 124 and the illumination device 352. Since, the illumination devices 354 enhance the existence of the shadows and make the shadows more readily reflected by reflective surface 114, the shadows are more clearly viewed in the projected image 126. As previously noted, the existence of the shadows in the image 126 further impresses on the eye/brain system that a three-dimensional image is being projected, thereby providing a more credible viewing experience.

However, to ensure the most beneficial affect of incorporating the illumination devices 352, the devices 352 must be positioned such that the light generated by the illumination devices 352 does not interfere with the image provided to the reflective surface 114. Thus, the illuminating devices 352 may preferably be oriented such that no light rays fall on any surface inside housing 102, which surface may reflect the light rays onto reflective surface 114. Where the light rays are reflected onto the reflective surface 114, the light rays may cause corruption of the real image 126 due to the existence of the spurious light. For example, in the exemplary embodiment shown, illumination devices 352 may be oriented such that no light rays projecting therefrom fall on the background wall since such light may reflect onto surface 114 corrupting the real image 126.

Figure 6:
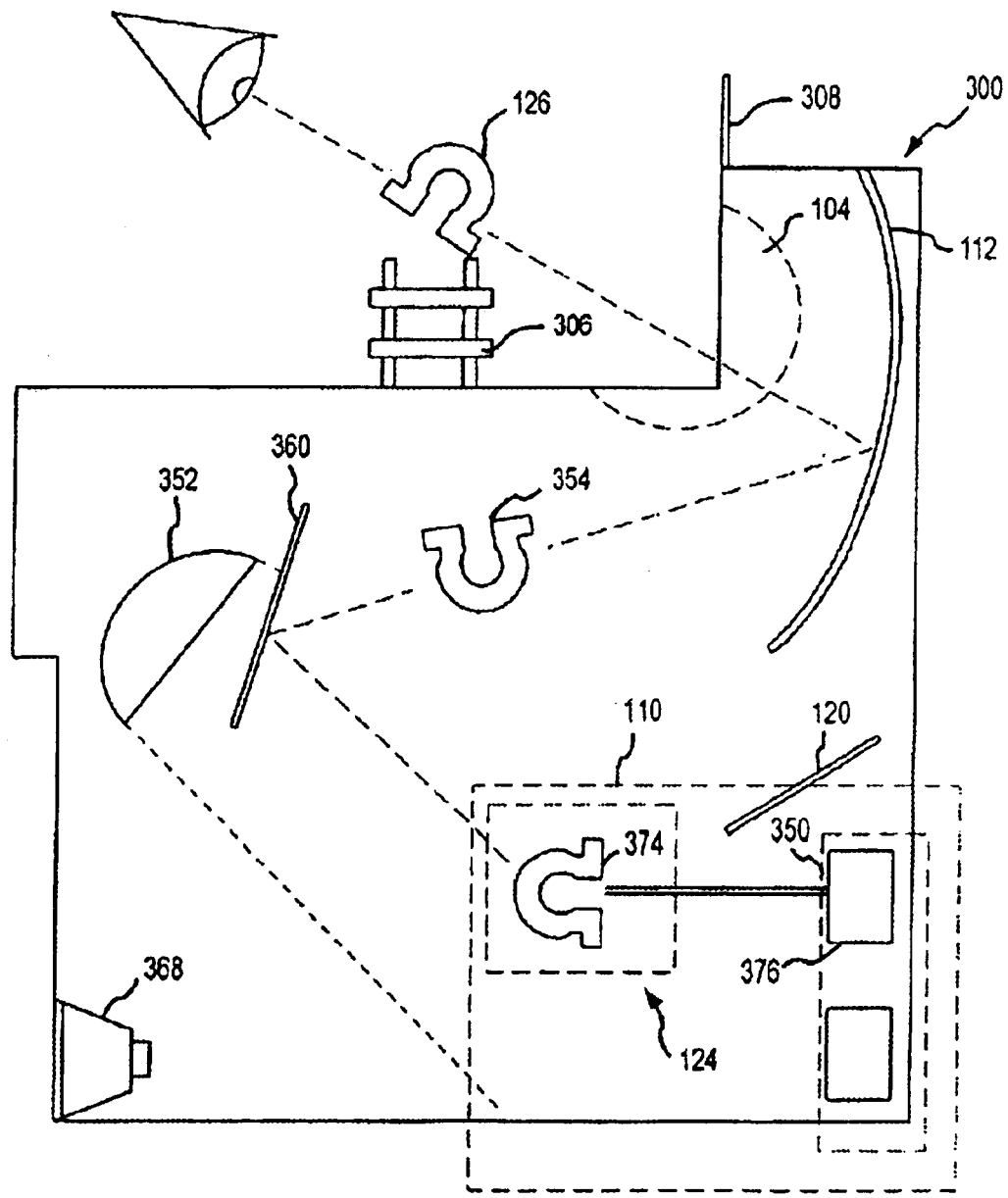
FIG. 6 illustrates another exemplary embodiment of a real image projection system in accordance with the present invention.

FIG. 6 illustrates another exemplary embodiment of the real image projection system 300, including an additional mirrored surface 360 for providing an image 354 of object 124. The image 354 may be provided to optical assembly 112 reflective surface 114 for projecting image 126. Image 126 may be projected into a viewable volume of space defined by an aperture 104.

In the present embodiment object 124 is depicted as including a dynamic animatronic puppet 374 in communication with a motion-promoting device 376. Motion promoting device 376 may be any device capable of controlling any position or movement of puppet 374. In this case, the puppet 374 may be anthropomorphic as discussed above. The device 376 may be, for example, a motor-gear-drive shaft arrangement. Object 124 may be any object suitable for casting an image on a reflective surface. Thus, although depicted as a dynamic animatronic puppet, object 374 may take any form, and may include a film projection or picture slide device or the like.

Mirrored surface 360 may be any surface for providing an image capable of being reflected by optical assembly 112. In that regard, mirrored surface 360 may be a conventional flat mirror, a concave mirror or the like. Mirrored surface 360 may be uniform, irregular or include multiple mirrors configured to provide a reflection of an object, or may be constructed to provide additional image enhancements. For example, mirrored surface 360 may incorporate background features, which may be reflected to reflective surface 114 for reflecting adjacent to aperture 104. In a typical embodiment, mirrored surface 360 may include a background feature such as simulated smoke, trees, clouds or the like which when reflected with the image 354 may serve to simulate that the image 354 is moving within the featured environment. In addition, mirror 360 may be coupled to a positioning device (not shown) for orienting the mirror 360 position in similar manner as is described with respect to device 128. Thus, mirrored surface 360 may be positioned anywhere in between puppet 374 and reflective surface 114. This is especially useful where it is desired to reduce the overall size of the housing 102, while maintaining the size of the image 126. That is, mirrored surface 360 may be configured or positioned such that the distance traveled by the light reflected from the object presentation apparatus 110 is substantially similar to the case where the object 124 is presented directly to surface 114 to produce an object of substantially similar size.

Further, the exemplary embodiment 300 may include speakers 368 for projecting sound to enhance the experience of the observer. The speakers 368 may be any conventional operation for providing audible sound, music or the like. In one particular case, the speakers 368 may include controllers, microcontrollers, microchips, processors, and/or sound cards and the like.

The present invention has been described above with reference to various exemplary embodiments. However, those skilled in the art will recognize that changes and modifications may be made to the exemplary embodiments without departing from the scope of the present invention. For example, the various operational steps, as well as the components for carrying out the operational steps, may be implemented in alternate ways depending upon the particular application or in consideration of any number of cost functions associated with the operation of the system, e.g., various steps may be deleted, modified, or combined with other steps. In addition, the real image projection system embodiments disclosed herein may be modified or changed to accommodate multiple image casting. For example, a specialized housing may be constructed that permits one or more real images to be projected in multiple viewable volumes of space. Further still, the present invention may include one or more baffles for use in blocking an object from presentation to a reflective surface of the optic assembly object presentation apparatus. Such baffles may take any suitable form and may be preferably opaque. The changes and/or modifications described above are intended to be included within the scope of the present disclosure, as set forth in the following claims.

We claim:

1. A real image projection system comprising:
  a. a projection system housing including a visual reference and an aperture providing a viewable volume of space;
  b. an optical assembly for projecting adjacent to said viewable volume of space a real image of an object, said optical assembly including a concave reflective inner surface, the reflective inner surface including a principal axis drawn perpendicular to the substantial center of said reflective inner surface,
  c. an object support for orienting an object adjacent to said reflective inner surface, said object support orienting said object invertedly below said principal axis; and
  d. a baffle for obscuring said object support from said reflective inner surface, said baffle positioned in between said object support and said reflective inner surface, wherein said optical assembly is in communication with a position controller for rotating said reflective inner surface about said principal axis.

2. A system according to claim 1, wherein said aperture includes at least an aperture door.

3. A system according to claim 2, wherein said aperture door is configured to at least one of conceal and reveal said viewable volume of space.

4. A system according to claim 1, wherein said visual reference is one of a foreground reference, a background reference and an adjacent reference.

5. A system according to claim 1, wherein said object support is configured to move said object at least one of vertically, horizontally and in greater proximity to said optical assembly.

6. A system according to claim 1, wherein said object support is configured to move at least a subpart of said object.

7. A system according to claim 1, further comprising a housing positioning device in communication with said projection system housing for orienting said projection system housing position.

8. A system according to claim 1, wherein said housing further comprises at least a first light source for illuminating said object.

9. A system according to claim 1, further including a sound projection system.

10. A system according to claim 1, further including an anti-glare panel, wherein said reflective inner surface further includes an outer perimeter, said anti-glare panel positioned in proximity to said outer perimeter for preventing light from contacting said concaved reflective inner surface in proximity to said outer perimeter.

11. A real image projection system comprising:
  a projection system housing including an aperture providing a viewable volume of space;
  a movable door unit for opening and shutting the aperture and providing a visual reference point for visual depth perception when open;
  an object support unit for moving an object within the projection system housing;
  an optical assembly for projecting adjacent to said viewable volume of space a real image of the object, said optical assembly including a plane reflective mirror and a concave reflective mirror surface, the concave reflective mirror surface including a principal axis drawn to a substantial center of said concave reflective mirror surface;

the object is positioned within the projection system housing relative to a focal point of the concave reflective mirror surface to project the real image to a display position exterior of the projection system housing aperture to provide a moving real image suspended above a portion of the projection system housing and adjacent the visual reference point of the open door unit;

a speaker unit for projecting sound, and a baffle member located in the projection system housing between the object and the object support unit to prevent a projection of an image of the object support unit through the aperture wherein the moving image moves adjacent the open door unit with complementary sound to appear floating in space.

12. A system according to claim 11, wherein the object support rotates the object.

13. A system according to claim 11, wherein the object support is configured to move the object at least one of vertically, horizontally, and in greater proximity to optical assembly.

14. A system according to claim 11, wherein the object support is configured to move at least a sub-part of the object.

15. A system according to claim 11, wherein the protective system housing further comprises at least a first light source for illuminating the object.

16. A system according to claim 11, wherein the object is an animatronic puppet.

* * * * *